United States Patent [19]

Tashiro

[11] Patent Number: 5,083,635
[45] Date of Patent: Jan. 28, 1992

[54] POWER TRANSMISSION SYSTEM FOR AUTOMOTIVE VEHICLE

[75] Inventor: Takao Tashiro, Tochigi, Japan

[73] Assignee: Tochigifujisangyo Kabushiki Kaisha, Tochigi, Japan

[21] Appl. No.: 556,168

[22] Filed: Jul. 20, 1990

[30] Foreign Application Priority Data

Jul. 31, 1989 [JP] Japan .................... 1-198434

[51] Int. Cl.⁵ .......................... B60K 17/344
[52] U.S. Cl. ...................... 180/248; 475/86; 475/221
[58] Field of Search ........... 180/233, 246–248, 180/249; 74/665 T; 475/89, 86, 85, 200, 221, 231

[56] References Cited

U.S. PATENT DOCUMENTS 4,779,699 10/1988 Hatano .................. 180/248
5,041,068 8/1991 Kobayashi ............. 180/248

FOREIGN PATENT DOCUMENTS 63-270237 11/1988 Japan .................... 180/249
63-291731 11/1988 Japan .................... 180/249

Primary Examiner—Charles A. Marmor
Assistant Examiner—Paul Dickson
Attorney, Agent, or Firm—Darby & Darby

[57] ABSTRACT

To provide symmetrically wide inner spaces near two front or rear wheels of an automotive vehicle in which an engine and a transmission are arranged in series in the vehicle transversal direction, a first large-sized viscous coupling is disposed near a small-sized front or rear differential gear to limit the differential motion thereof; and a second small-sized viscous coupling is disposed near a large-sized center differential gear to limit the differential motion thereof. The center differential gear is disposed on the transmission side to differentially distribute engine power to front and rear wheels, and the front or rear differential gear is disposed on the engine side to further differentially distribute engine power distributed by the center differential gear to right and left wheels.

4 Claims, 3 Drawing Sheets

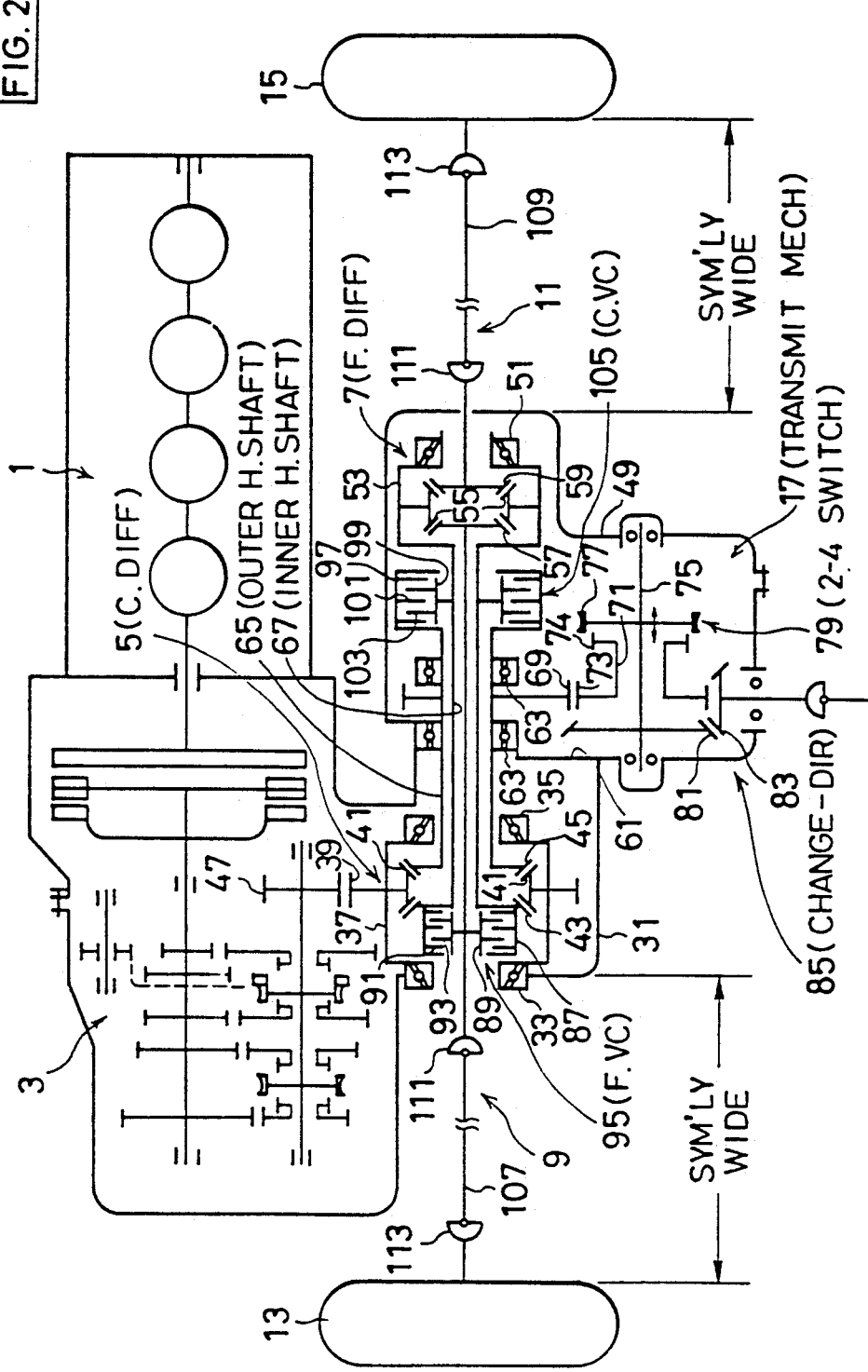

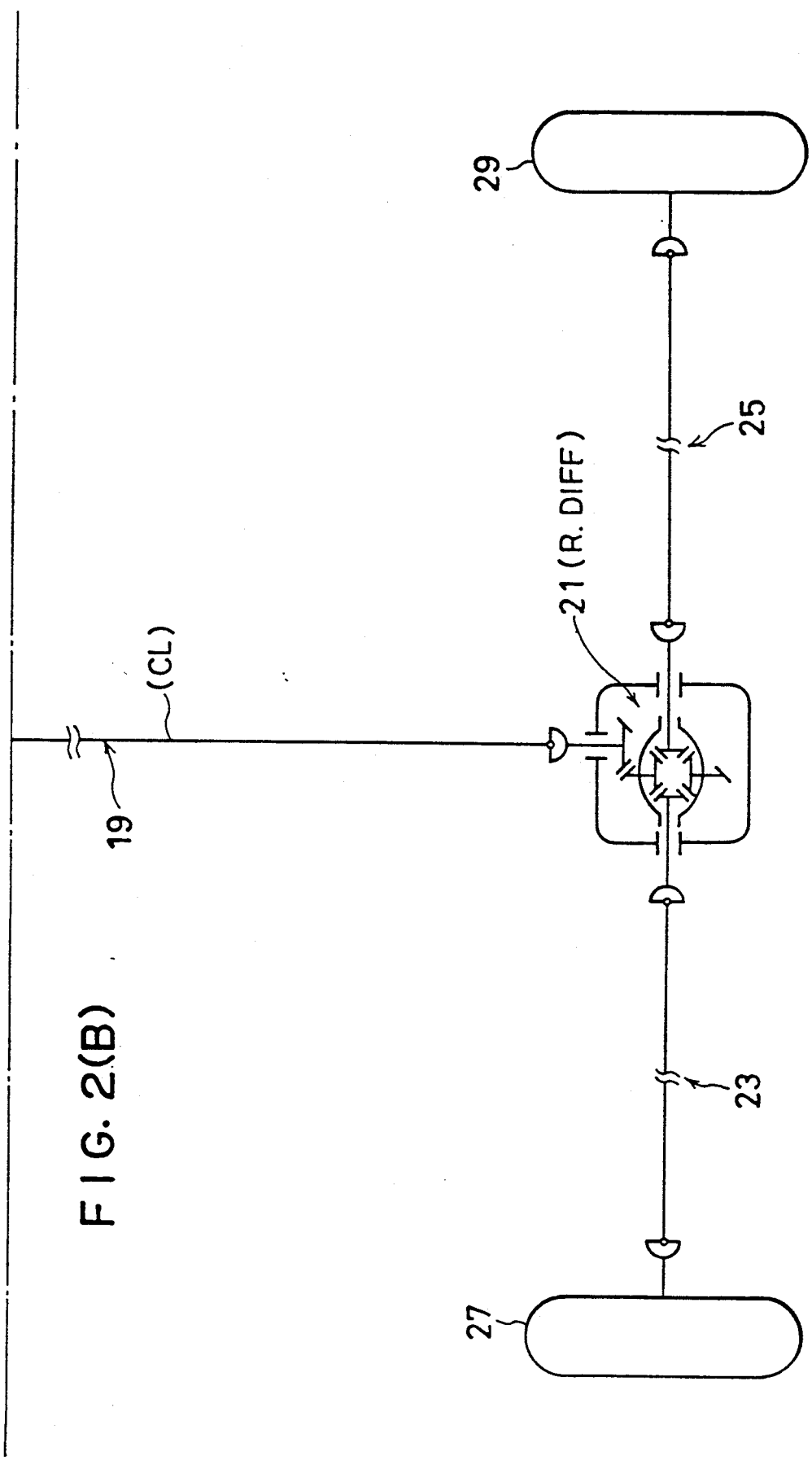

POWER TRANSMISSION SYSTEM FOR AUTOMOTIVE VEHICLE

BACKGROUND OF THE INVENTION

1. Field of the Invention

The present invention relates to a power transmission system for an automotive vehicle, and more specifically to a power transmission system suitable for use in an automotive vehicle in which an engine and a transmission are connected in series and arranged in the vehicle transversal direction.

2. Description of the Prior Art

A power transmission system for a 4-wheel drive vehicle in which an engine and a transmission are connected in series and arranged in the vehicle transversal direction is disclosed in Japanese Published Examined (Koho) Patent Appli. No. 62-9060, for instance, as shown in FIG. 1. This power transmission system comprises an engine 201, a transmission 203 driven by the engine 201, a center differential gear 205 connected to the transmission 203, a front differential gear 207 arranged coaxially with the center differential gear 205, and a change-direction gear assembly 209.

The center differential gear 205 distributes drive power supplied from the engine 201 through the transmission 203 differentially to the front differential gear 207 and the change-direction gear assembly 209. The front differential gear 207 further distributes engine power differentially to front left and right wheels 211 and 213, respectively. Further, a rear differential gear 219 distributes engine power transmitted through the power assembly 209 differentially to rear left and right wheels 215 and 217, respectively. As described above, the vehicle can be smoothly driven in 4-wheel differential drive mode.

In the above-mentioned power transmission system for a 4-wheel drive vehicle, however, when one of the front or rear wheels 211 and 213 or 215 and 217 slips on a slippery road, since engine power tends to concentrate to only the slipping wheel and therefore the vehicle will not be driven, two viscous coupling devices for limiting the differential motions of the center and front differential gears 205 and 207 are provided separately. However, where the viscous coupling device is simply attached to each of the center and front differential gears 205 and 207 respectively, since the width of the differential gear provided with a viscous coupling device increases in the vehicle transversal direction, there arise various problems as follows:

The lengths of the front left and right wheel shafts 221 and 223 decrease; spaces near the two front wheels 211 and 213 decrease; and therefore joint angles of joints 225 and 227 disposed between the front wheel shaft 221 or 223 and the wheel 211 or 213 increase.

In addition, since engine power transmitted to the center differential gear 205 is larger than that transmitted to the front differential gear 207 (because a four front and rear wheel driving power is supplied to the gear 205 but only a two front wheel driving power is supplied to the gear 207), the size of the viscous coupling device attached to the center differential gear 205 inveritably increases as compared with the viscous coupling device attached to the front differential gear 207. Therefore, the space near the wheel shaft 211 on the left wheel side in FIG. 1 decreases markedly as compared with that on the right wheel side, because of asymmetical device arrangement relationship with respect to the vehicle's longitudinal central line.

SUMMARY OF THE INVENTION

With these problems in mind, therefore, it is the primary object of the present invention to provide a power transmission system for a 4-wheel drive vehicle having an engine and a transmission connected in series in the vehicle transversal direction, which can provide symmetrically wide spaces near two front or rear wheels thereof.

To achieve the above-mentioned object, the power transmission system, according to the present invention, for an automotive vehicle having an engine and a transmission connected in series in a vehicle transversal direction, comprising: (a) first differential mean (5) disposed on transmission side, for differentially distributing engine power transmitted trough the transmission to front and rear wheels; (b) second differential means (7) disposed on engine side, for further differentially distributing engine power distributed by said first differential means to right and left wheels; (c) first differential motion limiting means (105) disposed near said second differential means, for limiting differential motion of said first differential means; and (d) second differential motion limiting means (95) disposed near said first differential means, for limiting differential motion of said second differential means.

The first and second differential means (5, 7) and said first and second differential motion limiting means (105, 95) are all arranged coaxially with each other along any one of front and rear wheel drive shafts, and the first differential means is housed within a transmission case (31), and said second differential means is housed within a transfer case (49) connected to the transmission case.

The first differential mean (5) is a large-sized central differential gear comprising a center differential case (37), a ring gear (39), center pinion gears (41), first and second opposing center side gears (43, 45), an inner hollow shaft (67), an outer hollow shaft (65), etc. The second differential means (7) is a front differential gear comprising a front differential case (53), front pinion gears (55), first and second opposing front side gears (57, 59), front left and right wheel drive shafts (9, 11), etc.

The first differential motion limiting means (105) is a large-sized first viscous coupling comprising a first housing (97) connected to said second center side gear (45) via said outer hollow shaft (65), a first hub member (99) connected to said first center side gear (43) via said inner hollow shaft (67); a plurality of inner and outer plates (101, 103), etc. The second differential motion limiting means (95) is a small-sized second viscous coupling comprising a second housing (87) fixed to said first center side gear (43) and connected to said front differential case (53) via said inner hollow shaft (67); a second hub member (89) connected to said first front side gear (57) via said front wheel drive shaft (9), a plurality of inner and outer plates (91, 93), etc.

In the power transmission system according to the present invention, since the first large-sized viscous coupling (105) is disposed near the small-sized front or rear differential gear (7) and the second small-sized viscous coupling (95) is disposed near the large-sized center differential gear (5), it is possible to provide symmetrically wide inner spaces near two front or rear wheels of the vehicle in which an engine and a transmission are arranged in series in the vehicle transversal direction on the front or rear side of the vehicle.

BRIEF DESCRIPTION OF THE DRAWINGS

FIGS. 2(A) and (B) are a combinational skelton diagram showing a power transmission system provided with differential limiting devices for a 4-wheel drive vehicle according to the present invention.

DETAILED DESCRIPTION OF THE PREFERRED EMBODIMENTS

Figure 1:
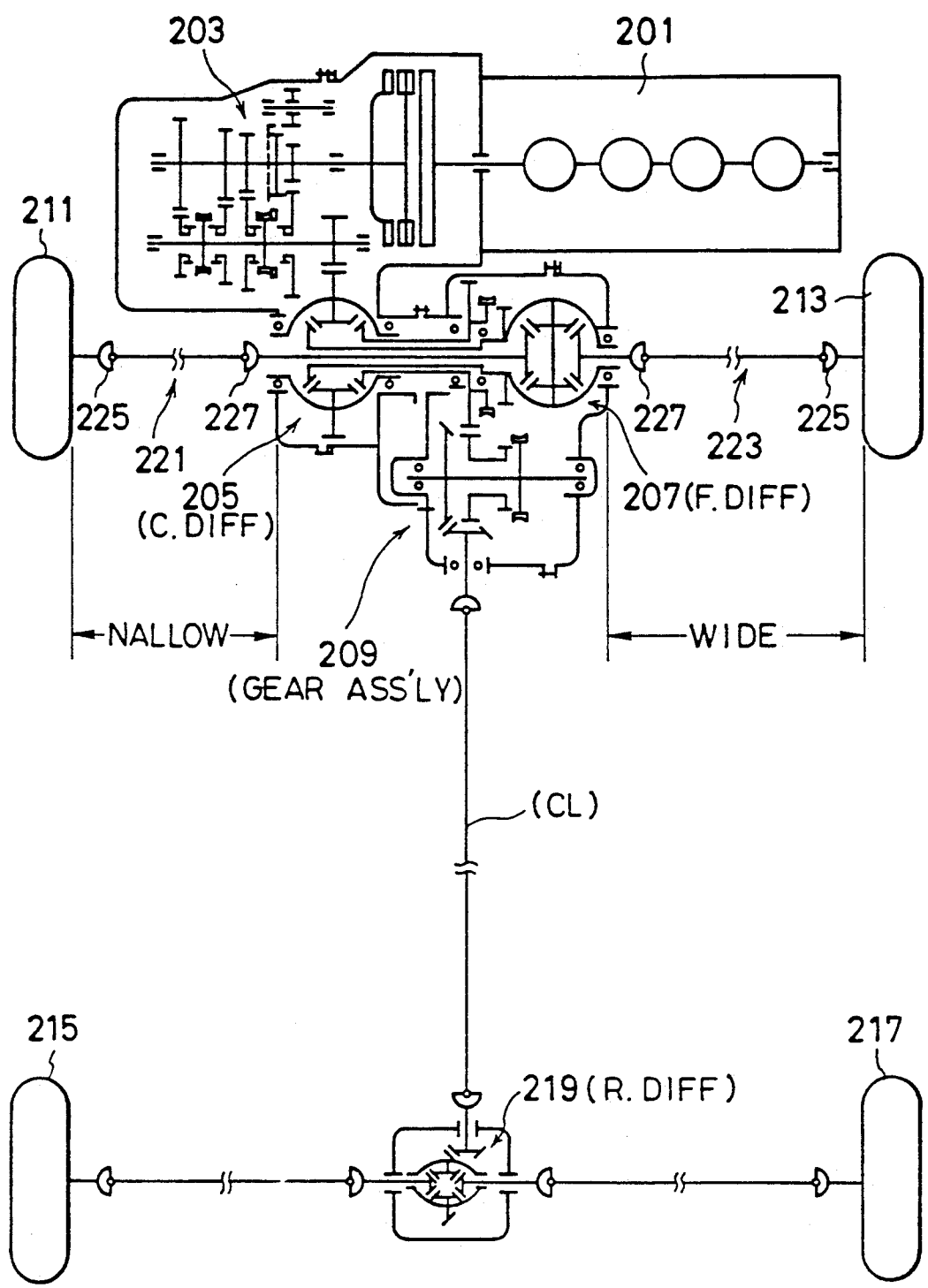
FIG. 1 is a skelton diagram showing a prior-art power transmission system provide with no differential limiting device for a 4-wheel drive vehicle.

With reference to FIG. 2, an embodiment of the power transmission system for a 4-wheel drive vehicle according to the present invention will be described hereinbelow. The feature of the present embodiment is to provide symmetricaly wide spaces near the two front wheels, respectively in a 4-wheel drive vehicle in which an engine and a transmission are arranged in series in the vehicle transversal direction. For the purpose, a large-sized differential limiting device (e.g. viscous coupling) associated with a large-sized central differential gear is disposed on the opposite side remote therefrom and a small-sized differential limiting device (e.g. viscous coupling) associated with a small-sized front differential gear is also disposed on the opposite side remote therefrom for providing a symmetrical system arrangement with respect to the vehicle's longitudinal central line (CL).

In more detail, the power transmission system roughly comprises an engine 1, a transmission 3, a center (first) differential gear 5, a front (second) differential gear 7, two front wheel drive shafts 9 and 11, two front wheels 13 and 15, a power transmission mechanism 17 including a change-direction gear assembly 85, a propeller shaft 19, a rear differential gear 21, two rear wheel drive shafts 23 and 25, two rear wheels 27 and 29, etc.

The center (first) differential gear 5 is housed within a casing 31 of the transmission 3, and comprises a differential case 37 rotatably supported by two bearings 33 and 35, a ring gear 39 fixed to an outer surface of the differential case 37, pinion gears 41 rotatably supported within the differential case 37, and two opposing side gears 43 and 45 in mesh with the pinion gears 41. The center differential gear 5 is driven by the transmission 3 via a drive gear 47 in mesh with the ring gear 39. Therefore, engine power transmitted to the differential case 37 via the transmission 3 is differentially distributed to the left and right side gears 43 and 45 via the pinion gears 41. The left side gear 43 is connected to the front differential gear 7 via an inner hollow shaft 67 to transmit power to the front wheels 13 and 15. The right side gear 45 is connected to a 2-4 drive switch device via an outer hollow shaft 65 to transmit power to the rear wheels 27 and 29. Therefore, when the differential case 37 is rotated, the rotative power is differentially distributed from the pinion gears 41 to the front differential gear 7 and a rear differential gear 21 via the two side gears 43 and 45.

The front (second) differential gear 7 is arranged coaxially with the center differential gear 5 and housed within a transfer case 49 fixed to the transmission case 31. The front differential gear 7 comprises a differential case 53 rotatably supported by a bearing 51, pinion gears 55 rotatably supported within the differential case 53, and two opposing side gears 57 and 59 in mesh with the pinion gears 55. The left side gear 57 is connected to the front left wheel 13 via the front wheel drive shaft 9, and the right side gear 59 is connected to the front right wheel 15 via the front wheel drive shaft 11. Therefore, when the differential case 53 is rotated, the rotative power is differentially distributed from the pinion gears 55 to the left and right front wheels 13 and 15 via the two side gears 57 and 59.

The right side gear 45 of the center differential gear 5 is fixed to an outer hollow shaft 65 passing through a partition 61 between the two cases 31 and 49 and rotatably supported by bearings 63 within the case 49. The left side gear 43 is fixed to the differential case 53 of the front differential gear 7 via an inner hollow shaft 67 passing through the outer hollow shaft 65. Therefore, the differential case 53 of the front differential gear 7 is driven by one 45 of the side gears (outputs) of the center differential gear 5. Further, the front left wheel drive shaft 9 is disposed passing through the inner hollow shaft 67.

Further, a 2-to-4 wheel drive switching device 79 is provided within the transfer case 49. That is, a ring gear 69 fixed to the outer hollow shaft 65 is engaged with a gear 73 disposed on the left end of a large-diameter hollow shaft 71. Further, a gear 74 is formed on the right end of the large-diameter hollow shaft 71. A slidable coupling sleeve 77 is slidably supported by an intermediate shaft 75. Therefore, when the coupling sleeve 77 is slid rightward along the shaft 75, since an inner gear of the coupling sleeve 77 is disengaged from the gear 74, the vehicle is driven in 2-wheel drive mode. However, when the coupling is slid leftward along the shaft 75, since the inner gear of the coupling sleeve 77 is engaged with the gear 74, the vehicle is driven in 4-wheel drive mode. Without being limited thereto, a coupling device of other kinds (e.g. clutch) can be adopted instead of the above-mentioned gear coupling device. In the 4-wheel drive mode, the engine power is transmitted from the right side gear 45 of the center differential gear 5 to the propeller shaft 19 via the 2-to-4 drive switching device 79 and the change-direction gear assembly 85 composed of a pair of two engaged bevel gears 81 and 83.

In addition to the above-mentioned devices, a first large-sized center (first) differential gear limiting device (e.g. viscous coupling) 105 and a second small-sized front (second) differential gear limiting device (e.g. viscous coupling) 95 are further provided coaxially with the two differential gears 5 and 7 as follows:

The first large-sized viscous coupling 105 disposed within the transfer case 49 comprises a housing 97 connected to the second side gear 45 of the center differential gear 5 via the outer hollow shaft 65, a hub member 99 connected to the first side gear 43 of the center differential gear 5 via the inner hollow shaft 67, a plurality of inner plates 101 fixed to the inner surface of the housing 97, a plurality of outer plates 103 fixed to the outer surface of the hub member 99 and arranged in alternate juxtapose positional relationship with respect to the inner plates 101, a high-viscous silicon oil charged into a working chamber formed between the housing 97 and the hub member 99. Since the housing 97 is connected to the right side gear 45 of the center differential gear 5 via the outer hollow shaft 65, and the hub member 99 is connected to the left side gear 43 of the same gear 5 via the inner hollow shaft 67, differential motion between the housing 97 and the hub member 99 is limited, so that the differential motion of the first (center) differential gear 5 is limited by the first large-sized viscous coupling 105 disposed remote from the gear 5 on the opposite side with respect to the vehicle's longitudinal central line (CL).

The second small-sized viscous coupling 95 disposed within the transmission case 31 comprises a housing 87 fixed to the first center side gear 43 and connected to the differential case 53 of the front differential gear 7 via the inner hollow shaft 67, a hub number 89 connected to the first side gear 57 of the front differential gear 7 via the front wheel drive shaft 9, a plurality of inner plates 91 fixed to the inner surface of the housing 87, a plurality of outer plates 93 fixed to the outer surface of the hub member 89 and arranged in alternate juxtapose positional relationship with respect to the inner plates 91, a high-viscous silicon oil charged into a working chamber formed between the housing 87 and the hub member 89. Since the housing 87 is connected to the differential case 53 via the inner hollow shaft 67, and the hub member 89 is connected to the left side gear 57 of the front differential gear 7 via the front wheel drive shaft 9, differential motion between the housing 87 and the hub member 89 is limited, so that the differential motion of the second (front) differential gear 7 is limited by the second small-sized viscous coupling 95 disposed remote from the gear 7 on the opposite side with respect to the vehicle's longitudinal central line (CL).

Further, the viscous coupling limits the differential motion by the shearing resistance of the silicon oil charged in the working chamber in such a way that the higher the difference in rotative speed between the housing and the hub member is, the more will be the limiting power.

The operation of the power transmission system shown in FIG. 2 will be described hereinbelow.

Power of the engine 1 is transmitted to the center differential gear 5 via the transmission 3, and distributed to the front differential gear 7 via the left side gear 43 and the inner hollow shaft 67 and to the rear differential gear 21 via the right side gear 45, the outer hollow shaft 65, the transmission mechanism 17 (the 2-4 wheel drive switch device 79 and the changer-direction mechanism 85), the propeller shaft 19, etc.

The engine power transmitted to the front differential gear 7 is further distributed to both the front wheels 13 and 15, and that transmitted to the rear differential gear 21 is further distributed to both the rear wheels 27 and 29, respectively. As described above, since the vehicle can be driven by a four wheels in differential operation mode, the vehicle can be turned smoothly without producing tight braking phenomenon.

On the other hand, when the front or rear wheels slip on a slippery road, since the differential motion of the center differential gear 5 can be limited by the first viscous coupling 105, it is possible to drive the front or rear wheels which are not slipping. In the same way, since the differential motion of the front differential gear 7 can be limited by the second viscous coupling 95, it is possible to drive the right or left front wheel which is not slipping. Therefore, it is possible to prevent the vehicle from being kept in a stuck condition on a muddy road. In addition, it is possible to improve the vehicle straight running stability by the differential limiting function between the front and rear wheels and between the right and left wheels.

As already described, since engine power is first transmitted to the center differential gear 5 to drive all the four front and rear wheels and then distributed to the front differential gear 7 to drive only the two front wheels, the sizes of the center gear 5 and the first viscous coupling 105 are large as compared with those of the front gear 7 and the second viscous coupling 95. In the power transmission system according to the present invention, however, since the second small-sized viscous coupling 95 is disposed on the side of the large-sized center differential gear 5 and the first large-sized viscous coupling 105 is disposed on the side of the small-sized front differential gear 7, it is possible to reduce the overall width of the power transmission system in symmetry with respect to the vehicle's longitudinal central line. In other words, it is possible to symmetrically widen both the spaces between the power transmission system and the front right and left wheels, so that the length of the front wheel drive shaft 107 or 109 can be increased; the joint angle of the joint 111 or 113 can be reduced; and therefore the design of devices or mechanisms related to the front wheels can be facilitated.

An embodiment of the power transmission system according to the present invention applied to a front engine vehicle has been explained. Without being limited thereto, however, it is of course possible to apply the power transmission system according to the present invention to an automotive vehicle in which the engine and the transmission are arranged in series in the vehicle transversal direction on the vehicle rear side. In this case, the front differential gear 7 is replaced with a similar rear differential gear, and the rear differential gear 21 is replaced with a similar front differential gear.

Further, viscous coupling has been explained as the differential motion limiting device by way of example. Without being thereto, however, it is also possible to adopt other differential motion limiting devices such as friction clutches, electromagnetic clutches, etc. in the same mutually opposite positional arrangement of the large- and small-sized differential motion limiting devices and differential gears.

What is claimed is:

1. A power transmission for an automotive vehicle having an engine in an engine side and a transmission in a transmission side, the engine and the transmission being connected in series in a vehicle transversal direction, the transmission comprising:
   (a) first differential means, disposed on the transmission side, for differentially distributing engine power transmitted through the transmission to front and rear wheels, said first differential means being a center differential gear and comprising
      (1) a center differential case rotatably supported;
      (2) a ring gear fixed to an outer surface of said differential case and driven by the transmission;
      (3) center pinion gears rotatably supported within said differential case;
      (4) first and second opposing center side gears in mesh with said pinion gears;
      (5) an inner hollow shaft, connected to said first center side gear, for transmitting distributed engine power to front wheels through said second differential means; and
      (6) an outer hollow shaft, connected to said second center side gear, for transmitting distributed engine power to rear wheels;
   (b) second differential means, disposed on the engine side for further differentially distributing engine power distributed by said first differential means to right and left wheels;

(c) first differential motion limiting means for limiting differential motion of said first differential means and being disposed closer to said second differential means than to said first differential means, said first differential motion limiting means being a viscous coupling, the viscous coupling comprising:
  (1) a first housing connecting to said second center gear via said outer hollow shaft;
  (2) a first hub member connected to said first center side gear via said inner hollow shaft;
  (3) a plurality of first inner plates fixed to an inner surface of said first housing;
  (4) a plurality of first outer plates fixed to an outer surface of said first hub member and arranged in alternate juxtaposed positional relationship with respect to first inner plates; and
  (5) silicon oil charged into a working chamber formed between said first housing and said first hub member; and
(d) second differential motion limiting means for limiting differential motion of said second differential means and being disposed closer to said first differential means than to said second differential means, said first differential motion limiting means being larger in size than said second differential motion limiting means.

2. The power transmission system for an automotive vehicle of claim 1, wherein said second differential means is a front differential gear which comprises:
  (1) a front differential case connected to said inner hollow shaft and driven by said first center side gear of said center differential gear;
  (2) front pinion gear rotatably supported within said front differential case;
  (3) first and second opposing front side gears in mesh with said front pinion gears;
  (4) a front left wheel drive shaft, connected to said first front side gear, for driving a front left wheel; and
  (5) a front right wheel drive shaft, connected to said second side gear, for driving a front right wheel.

3. The power transmission system for an automotive vehicle of claim 1, wherein said second differential motion limiting means is a second viscous coupling smaller in size than said first differential motion limiting means, the second viscous coupling comprising:
  (1) a second housing fixed to said first center side gear and connected to said front differential case via said inner hollow shaft;
  (2) a second hub member connected to said first front side gear via said front wheel drive shaft;
  (3) a plurality of second inner plates fixed to an inner surface of said second housing;
  (4) a plurality of second outer plates fixed to an outer surface of said second hub member and arranged in alternate juxtaposed positional relationship with respect to said first inner plates; and
  (5) silicon oil charged into a working chamber formed between said first housing and said first hub member.

4. A power transmission for an automotive vehicle having an engine in an engine side and a transmission in a transmission side, the engine and the transmission being connected in series in a vehicle transversal direction, the transmission comprising:

(a) first differential means, disposed on the transmission side, for differentially distributing engine power transmitted through the transmission to front and rear wheels, said first differential means being a center differential gear and comprising:
  (1) a center differential case rotatably supported;
  (2) a ring gear fixed to an outer surface of said differential case and driven by the transmission;
  (3) center pinion gears rotatably supported within said differential case;
  (4) first and second opposing center side gears in mesh with said pinion gears;
  (5) an inner hollow shaft, connected to said first center side gear, for transmitting distributed engine power to front wheels through said second differential means; and
  (6) an outer hollow shaft, connected to said second center side gear, for transmitting distributed engine power to rear wheels;
(b) second differential means, disposed on the engine side for further differentially distributing engine power distributed by said first differential means to right and left wheels, said second differential means being a front differential gear which comprises:
  (1) a front differential case connected to said inner hollow shaft and driven by said first center side gear of said center differential gear;
  (2) front pinion gear rotatably supported within said front differential case;
  (3) first and second opposing front side gears in mesh with said front pinion gears;
  (4) a front left wheel drive shaft, connected to said first front side gear, for driving a front left wheel; and
  (5) a front right wheel drive shaft, connected to said second side gear, for driving a front right wheel;
(c) first differential motion limiting means for limiting differential motion of said first differential means and being disposed closer to said second differential means than to said first differential means, said first differential motion limiting means being a first viscous coupling;
(d) second differential motion limiting means for limiting differential motion of said second differential means and being disposed closer to said first differential means than to said second differential means, said second differential motion limiting means being a second viscous coupling smaller in size than said first differential motion limiting means, the second viscous coupling comprising:
  (1) a second housing fixed to said first center side gear and connected to said front differential case via said inner hollow shaft;
  (2) a second hub member connected to said first front side gear via said front wheel drive shaft;
  (3) a plurality of second inner plates fixed to an inner surface of said second housing;
  (4) a plurality of second outer plates fixed to an outer surface of said second hub member and arranged in alternate juxtaposed positional relationship with respect to said first inner plates; and
  (5) silicon oil charged into a working chamber formed between said first housing and said first hub member.

* * * * *